United States Patent [19]

Wegner

[11] 4,018,998
[45] Apr. 19, 1977

[54] COMMUNICATION HAND-SET FOLDABLE FOR PROTECTION

[75] Inventor: Siegfried Wegner, Peine-Vohrum, Germany

[73] Assignee: Elmeg Elektro-Mechanik GmbH, Peine, Germany

[22] Filed: Feb. 3, 1976

[21] Appl. No.: 654,849

[30] Foreign Application Priority Data

Feb. 3, 1975 Germany .......................... 2504314

[52] U.S. Cl. ................................................. 179/103
[51] Int. Cl.² ........................................ H04M 1/03
[58] Field of Search .............. 179/100 R, 103, 179, 179/184

[56] References Cited

FOREIGN PATENTS OR APPLICATIONS

| | | | |
|---|---|---|---|
| 792,307 | 8/1968 | Canada ............................. | 179/103 |
| 590,514 | 6/1925 | France ............................. | 179/100 |
| 822,251 | 11/1951 | Germany ............................ | 179/103 |
| 1,212,389 | 11/1970 | United Kingdom ............... | 179/103 |

*Primary Examiner*—George G. Stellar
*Attorney, Agent, or Firm*—Ralf H. Siegemund

[57] ABSTRACT

A handset for connection to a communication system to serve as peripheral equipment apparatus is constructed as a two-part unit, in which the casing parts are hinged together and when folded down audio and manual access parts and elements are covered, but are accessible when the casing parts are folded up. In the folded up position, the microphone and speaker have particular position to each other for optimizing use as regular telephone or as a loud-speaker phone (walki-talki).

5 Claims, 3 Drawing Figures

COMMUNICATION HAND-SET FOLDABLE FOR PROTECTION

BACKGROUND OF THE INVENTION

The present invention relates to communication equipment and more particularly, the invention relates to a peripheral equipment apparatus for testing telephone outlets or the like, and to be connected to a communication network or system. The apparatus, in particular, is a handset, which includes a microphone, a speaker and dial facilities as well as the necessary circuitry for linkage to the communication's network or system.

The known test equipment for telephone networks is usually constructed so that the ear phone or speaker as well as the microphone are more or less exposed, and are, therefore, continuously subjected to the environment. Thus, dust and dirt will readily accumulate and there is little, if any protection of the equipment against abuse, impacts, etc. Such test equipment may well be also subjected to rough handling, for example, outdoors or in plants or other manufacturing facilities. The quality of the communication must be expected to suffer generally, and specific items may be damaged rendering the device sooner or later useless.

DESCRIPTION OF THE INVENTION

It is an object of the present invention to construct a piece of peripheral equipment for communication networks or systems, so that it can withstand abusive conditions, rough handling and a rather dirty environment.

It is a specific object of the present invention to provide for a new construction for a handset apparatus of the type referred to in the introduction and which includes a speaker, a microphone and call equipment.

In accordance with the preferred embodiment of the present invention, it is suggested to provide a two part casing for these components, the two parts being hinged together and mutually cover audio and manual access portions of the parts in one, folded down position, but upon folding the casing parts up such access is available. Preferably, the speaker is located in one casing part, the microphone in the other part, whereby preferably the latter part contains also the dial out facility. The folded up position is preferably also a positively maintained position orienting the casing parts in a particular angle. For example; microphone and speaker may have the same distance and angular orientation as such elements have in a regular telephone receiver. This way, attenuation of cross-coupling and operative convenience are optimized. The construction principles underlying the invention, however, are readily usable to walki-talki equipment.

The folded down position of the casing parts should establish an operating state permitting response to incoming call signals. The folded up position establishes an operating state, e.g. for dial out and for communication. Thus, the casing parts are normally in the folded down position in which their construction affords maximum protection to all components, but the apparatus is prepared to respond to incoming calls. The parts fit preferably when in folded down position in contour matching configuration to minimize surface exposure.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIGS. 1 and 2 show a telephone test handset which has a two part housing comprised of an upper casing part 1 and a lower casing part 2 joint by means of a hinge 3. The parts 1 and 2 are hinged so that the surface 1a of upper part 1 will abut the surface 2a of part 2 when the two parts are folded together as per FIG. 1. The dimensions are chosen so that the surfaces 1a and 2a actually match as to contour and peripheral boundary.

Figure 1:
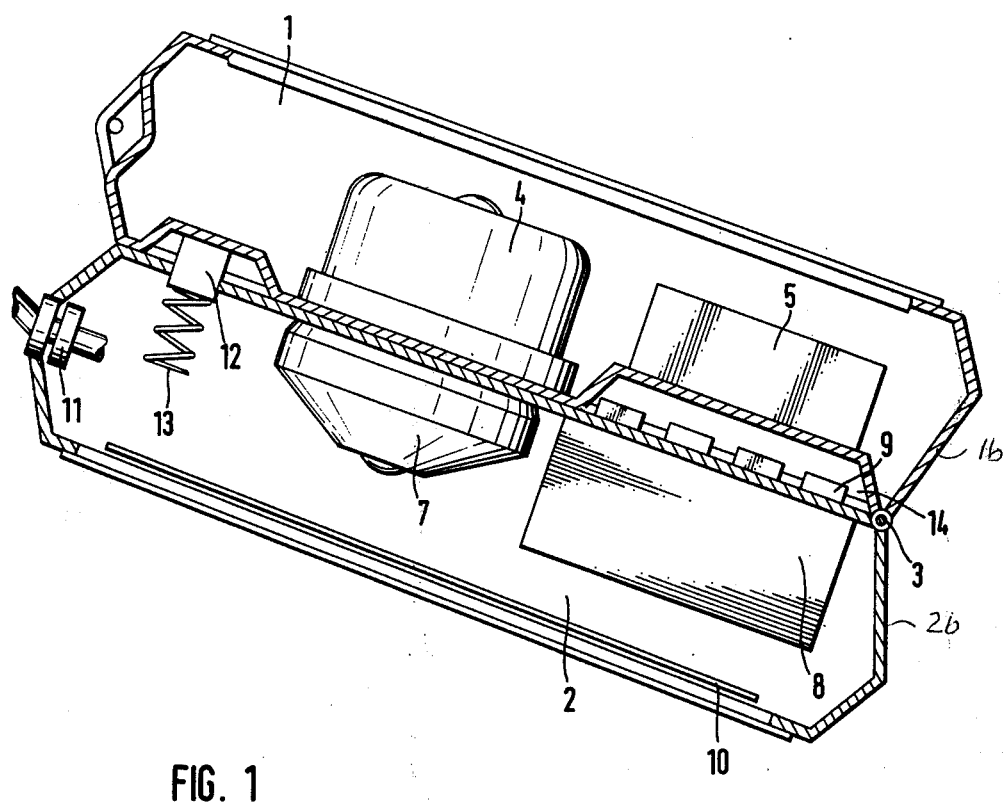
FIG. 1 is a section view, illustrating somewhat schematically a handset test apparatus in accordance with the preferred embodiment and in folded down position of its two casing parts.

The upper part 1 includes the ear phone or speaker module 4 and a module 5 responding to incoming calls; the module 5 may thus include a buzzer, bell or the like. The speaker 4, in particular, is mounted to the rear of casing wall 1a, which may have slots for audio access. Generally speaking, upper part 1 includes the components for receiving incoming signals when the handset is plugged in or is otherwise connected to a telephone outlet. Additionally, the upper part 1 has a means for suspending the handset, e.g. a safety hook 6 or the like, which can be turned.

The lower part 2 includes the microphone module 7 and the dial facility 8. The microphone 7 is mounted to the rear of casing wall 2a, which may also be provided with slots for audio access. In the particular example, the dial facility 8 is a key board with keys 9. Generally speaking, lower casing part 2 includes the transmission equipment of the handset. The keys 9 project above the surface 2a of casing part 2 and the surface 1a of casing part 1 is, therefore, provided with a depression 14 to accommodate the keys.

In addition, casing 2 holds a printed circuit board 10, on which are mounted all electrical circuit components such as capacitors, switches, relays, etc. not being inherently included in the modules 4, 5, 7 and 8. The board is shared by the receiver and transmitter portions of the apparatus. Also, a cable 11 leads into lower casing 2 for incoming and outgoing signals. The cable is used here for linking this handset with a communication network.

Reference numeral 12 refers to a switch which projects from surface 2a of casing 2, whose function is analogous to the function of a hook or cradle switch of a regular telephone set. A recess 15 in the surface 1a of upper casing 1 receives the button 12, when the casing parts 1 and 2 are folded together (FIG. 1). However, the bottom of the depression presses the switch 12 down to some extent. A spring 13 biases the switch into a first position for dialing and regular (two way) voice communication when the bottom of depression 15 does not press the switch 12 down. Upon manually or otherwise pressing switch 12 down, the handset has the operating state equivalent to standby condition for a regular telephone, permitting reception of any incoming call signal and response of call module 5.

As stated, hinge 3 hinges the casing parts 1 and 2 together, these parts can assume and maintain positively two positions. The first position is shown in FIG. 1 and the two surfaces 1a and 1b of the two casing parts become juxtaposed, whereby the switch 12 is depressed and is held in depressed position against the force of the spring 13. Thus, the unit is prepared to receive incoming calls. All parts, particularly the ear piece 4, the microphone 7, the dial facility 8 and here particularly the keys 9 are all enclosed by the two casings and are mutually covered. There may be a latch or the like to hold the parts together in this position to make sure that the manual and audio access parts are not accidentally exposed.

Figure 2:
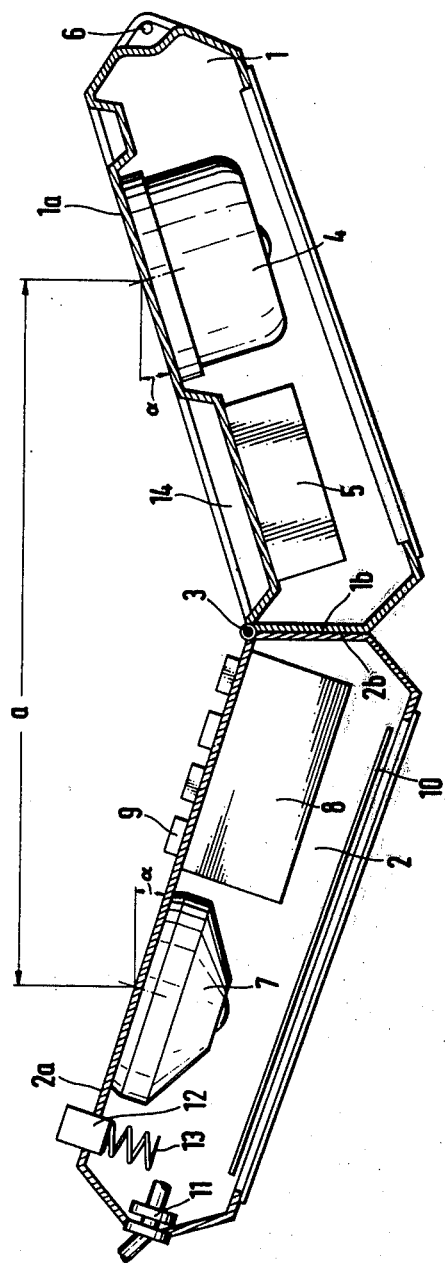
FIG. 2 shows the same apparatus, also in cross-section, but when in use and folded up position.

FIG. 2 shows the second operating position in which the upper part 1 is foleded off the lower part 2. The microphone and speaker are exposed for audio access and the key board is exposed for manual access. As the two parts are spread in this manner, switch 12 changes position by operation of spring 13. The set is now ready for dialing and communication. All operating parts are freely accessible. Returning for the moment to FIG, 1, the two casing parts have additionally rear walls 1b and 2b, which have a particular angle relative to each other when the parts 1 and 2 are folded down. Now, upon opening the casing up, the two rear walls 1b and 2b abut. Thus, in this second position the two parts 1 and 2 have the angle α and microphone 4 and speaker 7 are positioned analogous to the usual position of such elements in a regular telephone receiver. Moreover, in this position parts 4 and 7 have a distance a, which corresponds to the distance of similar parts in a regular telephone receiver. Thus, optimum conditions are established as far as attenuation of cross- coupling between receiver and transmitter is concerned, while the parts are conveniently used as a regular telephone.

Since the cable connection (cable 11) are run into the part 2 which holds the electric circuit components (board 5), only a small number of lines need to run through the hinge 3 to the upper part 1.

Figure 4:
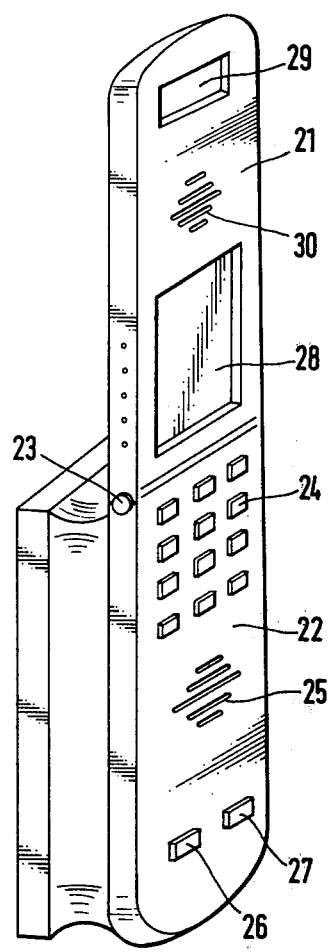
FIG. 4 is also a perspective view of the handset of FIG. 3, but in folded up position of its two casing parts.
Figure 3:
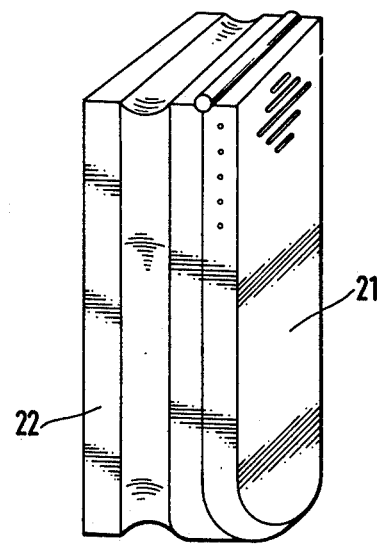
FIG. 3 is a perspective view of another example of the preferred embodiment showing also two casing parts in folded down position.

Proceeding to the description to FIGS. 3 and 4, the piece of peripheral equipment shown here is a loud speaker telephone having an upper casing part 21 and a lower casing part 22 and they are interconnected by means of a hinge 23. Again, the upper casing 21 can assume and positively maintain two positions relative to the lower casing part, which are depicted respectively in the two figures. FIG. 3 shows the one of the two positions in which the upper casing 21 is folded down and the two casings mutually cover all operating parts otherwise exposed. The two casings constitute a rather compact unit. The unit is also here in an operating state for receiving incoming call signals.

FIG. 4 shows the unit with upper part 21 folded up; the two positions differ by a relative angle of 180° between the two parts. Upon comparing the two figures, one can see that rear wall portions of the two parts are aligned in the folded down position, so that folding up covers 180°. All operating parts are now accessible, and the unit is ready for operation. First of all, one can see now a switch 26, which corresponds to switch 12 of the unit shown in FIGS. 1 and 2. Switch 26 may also be spring biased, but it may be a slide which is manually operated, not automatically. In either case, switch 26 is held down when parts 21, 22 are folded down, but in the folded up position switch 26 may be pulled out, because it does not automatically assume a pull out position when not spring biased. A second switch 27 is provided for alternatingly connecting the microphone and the loudspeaker to the signal lines. The microphone is located in the lower part 22, behind the slots 25. Analogously, slots 30 in the upper part 21 provide audio access to the loudspeaker in part 21. The lower part 22 contains, in addition, a key board 24 for dialing. The dial keys and the audio access slots are covered when the casing parts are folded down.

Two depressions or recesses 28 and 29 respectively are provided in upper part 21. The depression 28 receives and covers the key board and the depression 29 covers the two switches 26 and 27 and holds them down to prevent accidental operation.

The devices shown in the figures are readily adaptable to a walki-talki instead of a cable connection thereof. In such an instance, the respective device will include an antenna and the requisite parts for two way radio communication. The necessary electronics will be included in lower casing part.

The invention is not limited to the embodiments described above, but all changes and modifications thereof not constituting departures from the spirit and scope of the invention are intended to be included.

I claim:

1. A handset apparatus for use as a piece of peripheral equipment in a communication system or network, and including a speaker, a microphone and a dial facility in a casing, comprising, the casing being constructed to have an upper casing part, containing the microphone with audio-access thereto being located in a particular surface of the upper casing part, and a lower casing part containing the speaker with audio-access thereto being in a particular surface of the lower casing part, one of the particular surfaces containing also the dial facilities, all of the particular surfaces containing all other manual access facilities, the lower part being hinged to the upper casing part for a first superimposing position, in which the particular surfaces of the casing parts mutually cover each other so that the manual operation facilities and audio-access to the microphone and the speaker are covered accordingly, and for a second folded up position in which the parts have a particular angle for uncovering the said audio-access as well as for access to the dial facility.

2. A handset as in claim 1 and including an operating switch being one of said additional manual access facilities and being placed in position for receiving incoming call signals when the two parts are in the first position, the switch establishing operating conditions for dial out and communication when the parts are in the second position.

3. A handset as in claim 1, wherein the outer walls of the casing parts are oriented to establish said first and second positions being positions of abutment of different wall portions of the walls of the casing parts.

4. A handset as in claim 1, wherein the manual access facilities include elements which project from one of the casing parts, and the respective other casing parts has recesses to receive the projecting elements and covering them when the casing parts are in the first position.

5. A handset as in claim 1, the particular angle being 180° or less, but more than 90°.

* * * * *